United States Patent
Czmok et al.

(10) Patent No.: US 6,716,527 B1
(45) Date of Patent: Apr. 6, 2004

(54) HOT-MELT-TYPE ADHESIVE IN THE FORM OF A GRANULATE

(75) Inventors: Michael Czmok, Dormagen (DE);
Rainer Vogel, Langenfeld (DE);
Michael Kik, Langenfeld (DE);
Stephen Hatfield, Duesseldorf (DE);
Gerald Petry, Hueckelhoven (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 178 days.

(21) Appl. No.: 10/030,467

(22) PCT Filed: Jun. 28, 2000

(86) PCT No.: PCT/EP00/05997

§ 371 (c)(1),
(2), (4) Date: Jan. 9, 2002

(87) PCT Pub. No.: WO01/04229

PCT Pub. Date: Jan. 18, 2001

(30) Foreign Application Priority Data

Jul. 9, 1999 (DE) .......................................... 199 31 996

(51) Int. Cl.$^7$ ................................................ B32B 5/16
(52) U.S. Cl. ...................................... 428/403; 428/407
(58) Field of Search ................................ 428/403, 407

(56) References Cited

U.S. PATENT DOCUMENTS

| | | | |
|---|---|---|---|
| 3,528,841 A | 9/1970 | Donaldson et al. ........... 117/16 |
| 3,646,184 A | 2/1972 | Nobuo Nagao et al. ..... 264/144 |
| 3,846,365 A | 11/1974 | Berg et al. ................ 260/33.6 |
| 3,911,193 A | 10/1975 | Resz et al. .................. 428/407 |
| 4,359,492 A | 11/1982 | Schlademan ................ 427/222 |
| 4,576,835 A | 3/1986 | Gardenier et al. ........... 427/222 |
| 4,645,537 A | 2/1987 | Gardenier et al. ........... 106/243 |
| 4,774,138 A | 9/1988 | Gardenier et al. ........... 428/407 |
| 5,041,251 A | 8/1991 | McCoskey ................... 264/141 |
| 5,322,731 A * | 6/1994 | Callahan et al. ............. 428/327 |
| 5,688,449 A | 11/1997 | Fox ............................. 264/54 |
| 5,869,555 A | 2/1999 | Simmons et al. ........... 524/229 |
| 5,942,569 A | 8/1999 | Simmons et al. ........... 524/487 |
| 6,120,899 A * | 9/2000 | Cameron et al. ........... 428/407 |
| 6,127,002 A * | 10/2000 | Callahan et al. ............. 427/472 |
| 6,238,732 B1 * | 5/2001 | Cameron et al. ........ 427/208.2 |

FOREIGN PATENT DOCUMENTS

| | | |
|---|---|---|
| CA | 1 243 563 | 10/1988 |
| DE | 20 34 038 | 2/1972 |
| DE | 91 16 662 | 7/1993 |
| EP | 0 014 467 | 8/1980 |
| EP | 0 156 274 | 10/1985 |
| EP | 115 307 | 1/1987 |
| EP | 0 294 141 | 12/1988 |
| EP | 0 469 564 | 2/1992 |
| EP | 0 531 927 | 3/1993 |
| EP | 5 575 900 | 12/1993 |
| GB | 1 345 811 | 2/1974 |
| GB | 1 362 870 | 8/1974 |
| WO | WO 95/23823 | 9/1995 |
| WO | WO96/00747 | 1/1996 |
| WO | WO97/19582 | 6/1997 |
| WO | WO99/18147 | 4/1999 |
| WO | WO 99/18148 | 4/1999 |

* cited by examiner

*Primary Examiner*—H. Thi Le
(74) *Attorney, Agent, or Firm*—Stephen D. Harper

(57) ABSTRACT

A hotmelt adhesive is provided in the form of a granulate comprising at least one compact outer layer (shell) made up of at least one component which is not pressure sensitive up to 45° C. and which surrounds a core made up of other components of the hotmelt adhesive. The hotmelt adhesive granulates are free flowing even after storage at a high temperature under pressure.

32 Claims, No Drawings

HOT-MELT-TYPE ADHESIVE IN THE FORM OF A GRANULATE

This application claims priority from German application 19931996.0, filed Jul. 9, 1999, and International application PCT/EP00/05997, filed Jun. 28, 2000.

This invention relates to a pressure-sensitive hotmelt adhesive in the form of granules having at least one outer layer of at least one non-pressure-sensitive adhesive component of the pressure-sensitive hotmelt adhesive and a core of the other components of the pressure-sensitive hotmelt adhesive surrounded by said outer layer.

Coated granules such as these of pressure-sensitive adhesives to be applied from the melt are known. Thus, EP 531 927 describes a dimensionally stable pressure-sensitive hotmelt adhesive containing resins, elastomers and plasticizers as principal constituents. It is in the form of pellets or granules of which the surface consists of adhering powder of a meltable elastomer suited to the formulation. The powder-form elastomer preferably compensates for a small amount of the elastomer in the hotmelt adhesive of the core. The powdered granules are produced by depositing drops of the molten hotmelt adhesive onto a powder-covered conveyor belt and thus covering them with powder. The disadvantage of this is that the powder only affords the surface partial protection against unwanted sticking. This is because the granules show a tendency towards cold flow in the event of prolonged storage and block in the process, i.e. no longer flow freely.

Similar disadvantages arise with the free-flowing granules according to DE 20 34 038. These particles with a diameter of preferably 1 to 30 mm consist of an adhesive, dimensionally stable material in the core and a layer of powder on its surface. The particles preferably consist of an adhesive thermoplastic, more particularly an atactic polyolefin such as, for example, polybutene-1 or PP, and are covered with a powder layer of a special or similar kind of a hard thermoplastic, for example an isotactic polyolefin, such as polybutene-1. For their production, the particles to be powdered are formed by extrusion and cutting and are powdered in a fluidized bed simultaneously with the cooling of the particles obtained from the hot melt. The powder is solid. The particles to be powdered may be in an almost still liquid state or may be cooled to such an extent that they are only just tacky.

U.S. Pat. No. 4,359,492 describes the coating of pellets of tacky elastomeric materials with powder-form materials. The elastomeric materials are preferably pressure-sensitive adhesives while the powder-form materials are crumb-form polymers with a softening temperature of at least 95° C.

EP 294 141 describes coated pellets of synthetic polymers, for example EVA coated with PE. They are produced by a) extruding a first synthetic polymer to form a strand or pellets,
b) cutting the strand while it is still molten into pellets,
c) powdering the pellets with powder of a second polymer, the powder melting under the effect of the high temperature of the pellets and forming a layer,
d) cooling the coated pellets.

The powder may be heated to 30–40° C. before application. The coated pellets do not stick to one another. The disadvantage of the described coated pellets is that the surrounding layer is not continuous, allowing parts of the melt to leak out ("bleeding").

WO 96100747 describes a process for coating hotmelt adhesives which essentially comprises the following steps:

a) extruding the hotmelt adhesive through a suitable nozzle,
b) spraying the surface of the extruded hotmelt adhesive with a molten film-forming polymeric material of relatively low molecular weight or with a polymer formulation, the coating material having no significant effect on the properties of the adhesive composition after it has been remelted,
c) heating the surface of the coated adhesive so that the film-forming polymer is remelted and forms a continuous coating and
d) cooling the adhesive thus coated to temperatures suitable for handling.

The extruded hotmelt adhesive can be cooled after its extrusion and before its spray coating. However, it is preferably coated directly after extrusion. Finally, the coated extrudate is cut up. The disadvantage of this process and the resulting products is that the cut faces are not coated. Accordingly, the portions are not free-flowing.

EP 14 467 describes a process for the underwater granulation of ethylene copolymers, for example ethylene/vinyl acetate copolymers, in which 1 to 1,000 ppm of a surfactant are said to be added to the water to reduce agglomeration. The agglomeration temperature is thus increased by at least 10° C.

WO 97119582 describes a thermoplastic polymer composition with a non-tacky surface in the form of pellets of which 97 to 99.9% by weight consists of a pressure-sensitive adhesive and 0.1 to 3% by weight of a pelleting material which surrounds the thermoplastic composition. Materials from the group consisting of PE wax, modified PE wax, PA wax and stearamide wax and mixtures thereof are specifically mentioned as pelleting materials. They are in powder form. The document in question also mentions underwater granulation as a process for producing the tacky hotmelt adhesive pellets from which pellets with non-tacky surfaces which do not block are produced using the pelleting material. Production comprises the following steps:

producing a melt mixture from the starting components,
forming pellets with the aid of nozzles,
solidifying the pellets by cooling,
applying the pelleting material at certain places during the pelleting process and
drying.

The pelleting material is said to be applied during each extruder pass. It is added to the cooling medium. Its concentration in the water is between 0.1 and 3% by weight.

The disclosed process does not lead to the described products. More particularly, it does not lead to free-flowing granules after storage for 3 months at 30° C. for a layer thickness of the granules of 15 to 30 cm. The granules stick to one another and to the pack.

EP 156 274 describes a water-based release agent for the temporary antiadhesive surface finishing of tacky pellets, granules etc. which consists of a 0.5 to 25% by weight solution or dispersion of an at least difunctional aliphatic alcohol containing 3 to 7 carbon atoms and/or an at least trifunctional aliphatic hydroxycarboxylic acid or water-soluble salts thereof. 0.2 to 15% by weight of water-insoluble salts of a $C_{12-36}$ aliphatic or alicyclic mono- or dicarboxylic acid may be additionally used. The release agent is intended above all for the antiadhesive finishing of granules of hotmelt adhesives. To this end, the granules are treated with the solution or suspension at 18 to 22° C. and, after the solution or suspension has been removed under suction, the granules are dried for 15 minutes with warm air having a temperature of 30° C. The granules then contain 0.3 to 0.5% by weight of active substance. They can be protected. The release effect remains in tact for at least 3 months at 25° C. However, it is not sufficient for the storage temperature and the storage pressure to be increased. In addition, the finishing process is difficult on account of the agglomeration of the as yet non-finished granules.

German utility model 9116662.4 describes a packed adhesive composition where a quantity of substantially homogeneous separate portions of the adhesive composition is completely surrounded by a net or a bag of a plastic packaging material, preferably by a welded bag. The separate portions are preferably externally coated with a separating antiadhesive substance. Despite this antiadhesive substance, the portions stick to one another because of cracks in or flaking of the coating material, particularly after prolonged storage at varying temperatures. The surfaces of the individual adhesive portions are thus exposed and adhere to one another. This makes the hotmelt adhesives difficult to handle and, above all, to dose. To avoid this disadvantage, the adhesive portions—depite their antiadhesive coating—are packed in a bag which is then handled. The bag preferably contains 100 to 4,000 individual portions. The disadvantage of welding inadequately coated portions in a bag is that the entrapped air prevents the bag from being immersed in melting tanks. It floats on the adhesive melt which lengthens the melting time. Alternatively, larger melting units than actually necessary have to be used.

Against the background of this prior art, the problem addressed by the present invention was to provide a pressure-sensitive hotmelt adhesive which would still be easy to handle and, more particularly, easy to dose even after prolonged storage at varying temperatures and under high pressure. This would also include avoidance of the particles sticking to one another and to the pack. Rapid melting would also be possible. The adhesive properties would not of course be adversely affected by the antiadhesive finish.

The solution to this problem is defined in the claims and consists essentially in the formation around a granule core of a complete compact coating of material of a similar type.

Accordingly, the present invention relates primarily to a hotmelt adhesive in the form of granules having at least one compact outer layer (shell) of at least one adhesive component of the pressure-sensitive hotmelt adhesive which is not pressure-sensitive up to 40° C. and a core of the other components of the pressure-sensitive hotmelt adhesive surrounded by said outer layer.

The outer layers surround the core so completely, i.e. 90% and more particularly 99% of the core surface is surrounded, that the granules remain free-flowing. This degree of coverage is determined by the surface evaluation of micrographs.

Free-flowing means that the granules "flow" through a 5 cm diameter opening under their own weight, even after storage for 4 months and at least 2 months at temperature of −10 to +40° C. in a weekly rotation and under the pressure generated by a filling level of 30 cm.

The granules are 1 to 30 mm and preferably 4 to 10 mm in diameter. The granule size is determined by sieve analysis. The granules are preferably spherical in shape. However, they may also be elliptical.

It is surprising that free flow even after storage under extreme conditions is achieved despite the fact that the outer layers make up only a small percentage by weight of the hotmelt adhesive as a whole. The percentage by weight of the outer layers, based on the hotmelt adhesive as a whole, is between 0.5 and 10% by weight, preferably from 1 to 5% by weight and more preferably from 1 to 2% by weight. The percentage by weight is determined by statistical weighing.

The outer layers have a melting point to ASTM D 3461 or a softening temperature as determined by the R+B method of below 130° C., above all below 120° C. and more particularly below 110° C. However, it is generally above 95° C. and, more particularly, is 115° C. The measuring methods are carried out to ASTM D 3461.

The outer layers consist at least partly of a material which is also present in the core. Mixtures of materials may of course also be used although tackifiers should preferably be avoided. The outer layer may also consist of a low molecular weight, non-brittle raw material for the production of the pressure-sensitive hotmelt adhesive, preferably of a plasticizer.

However, more than 50% by weight of the outermost layer consists of at least one polymer, preferably a thermoplastic elastomer, more particularly from the group consisting of ethylene-based polymers, such as ethylene/vinyl acetate, ethylene acrylate, ethylene methacrylate, ethylene methyl acrylate, ethylene methyl methacrylate, high-density and low-density polyethylene, polyethylene mixtures and chemically modified polyethylene, copolymers of ethylene and di-unsaturated monomers, polybutadiene rubber, polyesters, such as polyethylene terephthalate, polybutylene terephthalate; thermoplastic polycarbonates, atactic poly-α-olefins, including atactic polypropylene and others; thermoplastic polyacrylamides, homopolymers and copolymers—more especially block copolymers—of acrylonitrile and other monomers, such as butadiene and styrene; polymethyl pentene, polyphenylene sulfide, polyurethanes; styrene/acrylonitrile, styrene/butadiene rubbers, polyphenylene sulfide, elastomers of the A-B-, A-B-A-, A-(B-A)$_n$-B- and (A-B)$_n$-Y-block copolymer type, in which the A comprises an aromatic polyvinyl block, above all styrene, while the B block comprises a rubber middle block, above all butadiene or isoprene, which may be partly hydrogenated, and mixtures of these substances.

It is appropriate to select a composition for the outer layer which, together with the core, corresponds to the required composition that would be used even without a coating. In other words, the type and quantity of the coating material corresponds to the difference between the packaged composition and the desired adhesive composition. Accordingly, the granule layer may consist of a hotmelt adhesive composition which, together with the granule core, gives a pressure-sensitive hotmelt adhesive after melting. In this case, it is not possible for the coating material to have any adverse effect whatever on the properties of the adhesive composition.

An ethylene/vinyl acetate copolymer with a vinyl acetate content of 10 to 45%, more particularly 15 to 30%, and a softening point of 80 to 130° C. is proposed as a particularly suitable coating material. It has a melt index of about 1 to 2,500 and more particularly in the range from about 6 to 400, as measured to ASTM D 1238/90 b.

Thermoplastic elastomers in particular, such as styrene block copolymers, are eminently suitable for producing the coating. The same also applies to polyisoprene.

Should the melting or softening temperature of the polymers be too high, it can be reduced by mixing with other adhesive components, for example with waxes or plasticizers. The mixture should not of course assume the properties of a pressure-sensitive adhesive, nor should it lead to blocking.

The coating material may be—in part at least—a plastic or a plastic composition which is not a constituent of the hotmelt adhesive, but which is suitable for simultaneous melting with the contents of the container and is miscible therewith in the molten state without the properties of the adhesive composition being adversely influenced to any significant extent by the mixing process. The plastic or plastic composition in question may be selected, above all, from known antiadhesive substances, for example polyethylene, preferably polyethylene powder.

The granules may also be made up of several layers, the tackifier generally making up the core which is surrounded by a first layer of a mixture of plasticizers and fillers and by a second layer of polymers and oxidants. The outer layer may also consist of a mixture of polymers and plasticizers in order to reduce the melting temperature or softening temperature in this way. However, the plasticizer has to be carefully selected to avoid unwanted migration into the outer layer.

The coating component is liquid during application and is preferably a water-free melt. However, a high-solids aqueous dispersion may also be used. An actual example of a melt is polyethylene wax or EVA while actual examples of an aqueous dispersion include a polyethylene emulsion, more particularly an emulsion of a Fischer-Tropsch wax containing a polyester film former, and polyvinyl acetate- or EVA-based emulsions. The aqueous dispersion is a fine-droplet dispersion with a mean droplet diameter of 0.5 to 12 µm.

From the perspective of the type and quantity of the individual components, the material of the granule core corresponds to a typical hotmelt adhesive composition, more particularly a pressure-sensitive hotmelt adhesive composition, provided that it is compatible with the material selected for the coating so that the coating can readily be dissolved by the user in the molten hotmelt adhesive. The hotmelt adhesive systems comprise a number of basic polymers which are mixed with other ingredients, such as plasticizers, tackifiers, stabilizers, waxes and extenders, to form the adhesive. The basic polymers largely determine the properties of the adhesive layer in regard to adhesion, strength and temperature behavior. The most important basic polymers are polyolefins, polyamides and polyurethanes.

Olefinic materials of the outer layer, such as polyethylene and poly(ethylene-co-vinyl acetate), are compatible with aliphatic and aromatic hydrocarbon hotmelt adhesives. Commercially available hotmelt adhesive compositions of this type contain hotmelt adhesives based on ethylene/vinyl acetate copolymer and on amorphous propylene-α-olefin (APAO). Any hotmelt adhesives based on styrene/butadiene/ styrene(SBS) copolymer-A-B-A-B-A-multiblock, structural hotmelts based on radial styrene/butadiene/styrene, (SB)n copolymers and structural hotmelts based on styrene/ isoprene/styrene (SIS) and -A-B-A- block copolymers may also be present. Other polymers are polybutene, ethylene/ acrylate, ethylene/CO and propylene/hexene copolymers.

Polyamide-based hotmelt adhesives may also be packaged by the process according to the invention, a container of a corresponding polyamide which is compatible with the hotmelt adhesive during the simultaneous melting process being preferred. Suitable polyamides are PA 6.6, PA 6.10, PA 6 and above all polyamides of diamines and dimerized fatty acids, more particularly of ethylenediamine and dimerized linoleic acid. Copolymers, for example polyamide/EVA copolymers, polyamide/siloxane copolymers, polyester amides, polyether amides, polyester amide imides and polyether ester amides, are of course also suitable.

For example, the present invention may also be applied to hotmelt adhesives which have been made from polymers and copolymers of synthetic resins, rubbers, polyethylene, polypropylene, polyurethane, polyacrylate, polyvinyl acetate, ethylene/vinyl acetate copolymers and polyvinyl alcohol.

The present invention is of particular advantage for hotmelt adhesives with serious handling problems, for example for the above-mentioned pressure-sensitive hotmelt adhesives which are tacky even at room temperature.

Special examples are hotmelt adhesives made from the following components:

1) elastic polymers, such as block copolymers, for example styrene/butadiene, styrene/butadiene/styrene, styrene/isoprene/styrene, styrene/ethylene/butylene/ styrene, styrene/ethylene/propylene/styrene;
2) ethylene/vinyl acetate polymers, other ethylene esters and copolymers, for example ethylene/methacrylate, ethylene/n-butyl acrylate and ethylene/acrylic acid;
3) polyolefins, such as polyethylene and polypropylene;
4) polyvinyl acetate and copolymers therewith;
5) polyacrylates;
6) polyamides;
7) polyesters;
8) polyvinyl alcohols and copolymers therewith;
9) polyurethanes
10) polystyrenes;
11) polyepoxides;
12) copolymers of vinyl monomers and polyalkylene oxide polymers;
13) aldehydes containing resins, such as phenol-aldehyde, urea-aldehyde, melamine-aldehyde and the like.

Components for improving adhesion, plasticizers, wax components, diluents, stabilizers, antioxidants, dyes and fillers may also be present.

The following are examples of components for improving adhesion:

1) natural and modified resins,
2) polyterpene resins,
3) phenol-modified hydrocarbon resins,
4) aliphatic and aromatic hydrocarbon resins,
5) phthalate esters and
6) hydrogenated hydrocarbons, hydrogenated resins and hydrogenated resin esters.

Examples of diluents include liquid polybutene or polypropylene, petroleum waxes, such as paraffin and microcrystalline waxes, semiliquid polyethylene, hydrogenated animal, fish and vegetable fats, mineral oil and synthetic waxes and also hydrocarbon oils.

Examples of the other additives can be found in the literature. To add to the disclosure, reference is specifically made to the detailed comments in EP 0 469 564 B1 on the usable hotmelt adhesive system, the thermoplastic polymers, tackifiers and plasticizers present therein, the subject matter of those comments being made part of the present application.

The present invention also relates to the process for producing the pressure-sensitive hotmelt adhesive in the form of granules. This process essentially comprises keeping the underwater granulation temperature so low that the granules have no real surface tackiness and keeping the temperature sufficiently low until the granules are coated. The low temperatures required for this purpose may readily be determined by tests for any pressure-sensitive hotmelt adhesive. The production process is characterized in that a) the core components are melted, b) the melt is granulated under water,
c) the underwater granules are cooled to such low temperatures that the surface tackiness of the cores is suppressed for at least 15 minutes, preferably to temperatures below 15° C., more preferably to temperatures below 10° C. and most preferably to temperatures below 5° C.,
d) the cooled underwater granules are dried,
e) the dried underwater granules are sprayed with the fine-droplet liquid coating component until a sufficiently thick layer, preferably with a thickness of 5 to 50 μm, has formed on the core and f) the coated cores are kept at an ambient temperature of 15 to 30° C. and more particularly ca. 20° C.

The temperature of the molten adhesive is preferably selected so that its Brookfield viscosity during extrusion is at least 2,000 mPas, as measured to ASTM D 3236. The preferred temperature of the adhesive during extrusion depends upon the composition of the pressure-sensitive hotmelt adhesive. In the case of the standard pressure-sensitive hotmelts, it has been found to be of advantage for the temperature of the adhesive during extrusion to be in the range from 80 to 150° C. and preferably in the range from 110 to 130° C.

A low temperature of the separate portions, more particularly the underwater granules, pending their coating is crucial to the invention. This requirement is satisfied particularly economically if the molten adhesive is extruded into a cooling fluid, more particularly into a water bath, of which the temperature is low enough to ensure that the separate portions have no real surface tackiness. The temperature of the cooling fluid depends upon the composition of the adhesive. For the usual pressure-sensitive hotmelt adhesives, the temperature of the cooling fluid is preferably at most 15° C., more preferably at most 10° C. and most preferably at most 5° C.

In general, the cooling effect is sufficient to prevent the surfaces of the separate portions from becoming tacky before they are coated. However, the cooling effect may be supported by the presence in the cooling fluid of a release agent, more particularly a fatty acid derivative and, in one particularly preferred embodiment, a stearate. Where a release agent is used, the temperature of the cooling fluid does not have to be as low as without the release agent and/or the time from the cooling of the separate portions to their coating can be extended. However, the process according to the invention can also be carried out without the use of a release agent, in which case weakening of the adhesive strength or other adverse effects on the product properties is avoided.

In some cases, it may be desirable for the granules according to the invention to have a low bulk density. This can be achieved if the granules are substantially spherical in shape and have various diameters. Where the adhesive is extruded into a water bath, this requirement can be satisfied if the extrusion die used has bores with different cross-sections.

In one particularly preferred embodiment, the granules have two different diameters and the diameter of the smaller granules is selected so that these granules find space in the voids of a close packing formed from the large granules and the smaller granules in particular have the largest possible diameter in fulfilling this requirement. Accordingly, this embodiment of the invention is aimed at filling the voids between the large granules with the smaller granules. In a particularly preferred embodiment, the smaller granules adjoin the surfaces of the larger granules on all sides.

The mixing of granules differing in size can be achieved in various ways. On the one hand, the multiple-bore extrusion die can have bores differing in their cross-sections so that the granules differing in size can be simultaneously produced and mixed in the same granulator. On the other hand, the granules differing in size can also be produced in granulators with different bore diameters and then mixed in a subsequent step.

In addition, it is of advantage in the interests of a close packing if 20 to 40% by weight and more particularly 30% by weight of the pressure-sensitive hotmelt adhesive consists of the smaller diameter granules.

After the separate portions have been produced and cooled with a cooling fluid, more particularly water, the cooling fluid should be separated from the pressure-sensitive hotmelt adhesive. It has surprisingly been found that this can be achieved by drying in a drum dryer with warm air having a temperature of 5 to 40° C. and more particularly 10 to 25° C. without the separate portions of pressure-sensitive hotmelt adhesive sticking to the walls of the dryer or to one another and forming lumps.

The coating component has a temperature during spraying of 20 to 60° C. and more particularly in the range from 25 to 35° C.

Drying and coating are preferably carried out in a fluidized bed, drying preferably being carried out continuously in the first zone of a fluidizing channel and coating being carried out in at least one other zone. Corresponding fluidized bed processes are known in the pharmaceutical industry for the production of dragées. In a preferred embodiment, the granules are placed in a state of intensive motion before being repeatedly guided statistically past at least one nozzle from which the coating component is sprayed onto the granules, the motion of the granules being generated either by "whirling" with cold air at 25 to 50° C. and preferably 30 to 40° C. or by a rotating container, for example in the form of a drum. The sprayed droplets are between 0.5 and 200 μm in size and preferably between 2 and 20 μm in size. On encountering the sprayed droplets, the liquid emulsion flows around the surfaces of the cores of granules and completely envelops them. Providing the machine parameters are set accordingly, a compact and completely continuous layer can thus be applied to the granule cores and will not burst open or become tacky, even under pressure.

The granules are thus protected against further sticking and can be directly packed in boxes, bags, etc.

For use, the free-flowing granules are melted and applied in molten form.

The solution according to the invention affords the following advantages over powder coating for example: fully continuous surface, clean process (dust), better control of coating, easier and better handling by the customer.

The invention is illustrated by the following Example:

EXAMPLE

The Example was carried out with the high-tack pressure-sensitive hotmelt adhesive Euromelt 654 (a product of Henkel KGaA). This adhesive consists essentially of a rubber-based polymer, mineral oils and resins. Its softening point, as determined by the ring-and-ball method ("R+B value" for short), is 95° C. It has a viscosity of 2,000 mPas at 160° C., 4,900 mPas at 140° C. and 17,000 mPas at 120° C.

The product is conventionally prepared from the raw materials in a mixer at 160° C. To increase viscosity, the product was introduced into the mixer and left there to cool. Two days later, the product had reached a temperature of 115° C. and was further processed at that temperature in a Gala Industries underwater granulator which is suitable for the underwater granulation of non-surface-tacky hotmelt adhesives. To maintain the product temperature of 115° C., a companion heating system with a temperature of 120° C. was present. The product was delivered by a melt pump (rotational speed 10 to 25 r.p.m.) through a Gneuβ filter (T=115° C.) and a startup gate (T=115° C.) directly to a heated multiple-bore die (T=130° C.).

The melt was extruded through fifty circularly arranged bores of the multiple-bore die. The bores had a diameter of 2.8 mm. The product throughput was varied between 90 and 380 kg/h. The four blades rotating at a speed of 1600 r.p.m. arranged on the exit side of the die, i.e. also under water, chopped up the adhesive strands issuing from the die.

The stream of water was guided immediately past the exit side of the multiple-bore die. The water was kept at a temperature of 6° C. by addition of ice. In this Example, 3% of the release agent SPL 117 (a product of Henkel KGaA based on calcium stearate) was added to the water. However, the process according to the invention can also be carried out with good results without the addition of release agents.

Spherical granules were formed and were carried by the stream of water to the preliminary drying station known per se. The water removed was recycled. It can be kept at the required temperature by means of a heat exchanger and/or a cooling unit.

The predried granules were then post-dried for about 15 mins. in a drying drum operated with heated air (T=30° C.). By cooling the granules to around 6° C., surface tack was prevented from developing for about 20 mins. to such an extent that, surprisingly, drying could even be smoothly carried out in a drying drum.

The dried granule cores had a residual moisture content of less than 0.3% by weight and, immediately after leaving the drying drum, were subjected to fluidized bed coating in a fluidized bed coater with a spray unit for the emulsion.

The coating material consisted of the following components: polyethylene wax, defoamer and film former in water. As a coating film, it is non-tacky to a temperature of 45° C. and softens at 115° C. (R+B method).

Coated granules with the following properties were obtained:
- The percentage by weight of the layer was 0.5 to 1.0% by weight, based on the weight of the pressure-sensitive hotmelt adhesive as a whole.
- The thickness of the layer was 20 μm.
- the surface of the granule cores was 98% covered,
- the granules were free-flowing to 45° C.
- the granules had a diameter of ca. 5 to 15 mm.
- their adhesive properties were at least as good as the adhesive properties of the core component, as shown by spray tests in typical applications.

What is claimed is:

1. A pressure-sensitive hotmelt adhesive comprised of a plurality of adhesive components, said pressure-sensitive hotmelt adhesive being in the form of a granule having a) at least one compact outer layer of at least one of said adhesive components, wherein said at least one compact outer layer is not pressure-sensitive up to 45° C. and b) a core of at least one of said adhesive components surrounded by said outer layer.

2. The pressure-sensitive hotmelt adhesive of claim 1 wherein at least 90% of said core Is covered by said outer layer.

3. The pressure-sensitive hotmelt adhesive of claim 1 wherein at least 99% of said core is covered by said outer layer.

4. The pressure-sensitive hotmelt adhesive of claim 1 wherein said granule has a diameter of 1 to 30 mm.

5. The pressure-sensitive hotmelt adhesive of claim 1 wherein said granule has a diameter of 4 to 10 mm.

6. The pressure-sensitive hotmelt adhesive of claim 1 wherein said outer layer is 0.5 to 10% by weight of said pressure-sensitive hotmelt adhesive.

7. The pressure-sensitive hotmelt adhesive of claim 1 wherein said outer layer is 1 to 5% by weight of said pressure-sensitive hotmelt adhesive.

8. The pressure-sensitive hotmelt adhesive of claim 1 wherein said outer layer is 1 to 2% by weight of said pressure-sensitive hotmelt adhesive.

9. The pressure-sensitive hotmelt adhesive of claim 1 wherein said outer layer has a DSC melting point or an R&B softening temperature below 130° C.

10. The pressure-sensitive hotmelt adhesive of claim 1 wherein said outer layer has a DSC melting point or an R&B softening temperature below 120° C.

11. The pressure-sensitive hotmelt adhesive of claim 1 wherein said outer layer has a DSC melting point or an R&B softening temperature below 110° C.

12. The pressure-sensitive hotmelt adhesive of claim 1 wherein said outer layer comprises an adhesive component which is also present in said core.

13. The pressure-sensitive hotmelt adhesive of claim 1 wherein said outer layer is comprised of a plasticizer.

14. The pressure-sensitive hotmelt adhesive of claim 1 wherein more than 50% by weight of said outer layer is comprised of at least one polymer.

15. The pressure-sensitive hotmelt adhesive of claim 1 wherein more than 50% by weight of said outer layer is comprised of a thermoplastic elastomer.

16. The pressure-sensitive hotmelt adhesive of claim 1 wherein more than 50% by weight of said outer layer is comprised of one or more polymers selected from the group consisting of SBS, SIS, ethylene/vinyl acetate polymer, ethylene/propylene polymer, polyether/urethane polymer, polyester/urethane polymer, silicone polymer, polyester and natural rubber.

17. The pressure-sensitive hotmelt adhesive of claim 1 wherein said granule is spherical or elliptical in shape.

18. The pressure-sensitive hotmelt adhesive of claim 1 wherein said outer layer has a melting point or an R&B softening temperature above 95° C.

19. The pressure-sensitive hotmelt adhesive of claim 1 wherein said outer layer is comprised of polyethylene wax.

20. A process for producing the pressure-sensitive hotmelt adhesive of claim 1, said process comprising:
   a) melting the adhesive components of said core to form a melt;
   b) granulating said melt under water to form underwater granules;
   c) cooling the underwater granules to a temperature effective to suppress the surface tackiness of the underwater granules to form cooled underwater granules;
   d) drying the cooled underwater granules to form dried underwater granules;
   e) spraying the dried underwater granules with a fine-droplet liquid coating component to form said outer layer.

21. The process of claim 20 wherein the cooled underwater granules are dried with air having a temperature of 5 to 40° C.

22. The process of claim 20 wherein the fine-droplet liquid coating component contains 20 to 90% by weight water.

23. The process of claim 20 wherein the fine-droplet liquid coating component contains 20 to 40% by weight water.

24. The process of claim 20 wherein steps d) and e) are carried out in a fluidized bed.

25. The process of claim 20 wherein step d) is carried out continuously in a first zone of a fluidizing channel and step e) is carried out in at least one of the fluidizing channel other than said first zone.

26. The process of claim 20 wherein in step e) the dried underwater granules are placed in a state of intensive motion before being repeatedly guided statistically past at least one nozzle from which the fine-droplet liquid coating component is sprayed onto the dried underwater granules.

27. The process of claim 26 wherein said intensive motion is generated by whirling with cold air at 25 to 50° C.

28. The process of claim 26 wherein said intensive motion is generated by a rotating container.

29. The process of claim 20 wherein steps d) and e) are carried out in 15 minutes or less.

30. The process of claim 20 wherein said fine-droplet liquid coating component is sprayed in the form of droplets between 2 and 20 μm in size.

31. The process of claim 20 wherein said fine-droplet liquid coating component is comprised of polyethylene wax, defoamer, film former and water.

32. A pressure-sensitive hotmelt adhesive comprised of a plurality of adhesive components, said pressure-sensitive hotmelt adhesive being In the form of a spherical or elliptical granule 1 to 30 mm in diameter having a) at least one compact outer layer of at least one of said adhesive components, wherein said at least one compact outer layer is not pressure-sensitive up to 45° C. and b) a core of at least one of said adhesive components surrounded by said outer layer and at least 90% covered by said outer layer, wherein said outer layer is 1 to 5% by weight of said pressure-sensitive hotmelt adhesive, has a DSC melting point or an R&B softening temperature above 95° C. and below 120° C., and is comprised of more than 50% by weight of at least one polymer.

* * * * *